United States Patent

[11] 3,568,834

[72] Inventor Lyle G. Treat
 Ferguson, Mo.
[21] Appl. No. 874,418
[22] Filed Nov. 5, 1969
[45] Patented Mar. 9, 1971
[73] Assignee The Dow Chemical Company
 Midland, Mich.

[54] FILTERING ALKALINE METAL CLEANER
 12 Claims, No Drawings
[52] U.S. Cl. .................................................. 210/71,
 72/42, 134/10
[51] Int. Cl. .................................................. B08b 3/10
[50] Field of Search .................................................. 72/42;
 252/33.6, 39, 42; 210/70, 71; 134/10, 15

[56] References Cited
UNITED STATES PATENTS
3,408,843 11/1968 Treat .................................. 252/42X Primary Examiner—Samih N. Zaharna
Attorneys—Griswold & Burdick and Edward E. Schilling ABSTRACT: Process of fine filtering an alkaline metal cleaner containing emulsified soluble oil in which the requisite amount of aminopolyacetic acid or ammonium or alkali metal salt thereof is added to the cleaner periodically to maintain unchelated hardness in the range of zero to about 400 p.p.m. hardness expressed as $CaCO_3$, and up to 2 percent by weight of free polyacetic acid or ammonium or alkali metal salt thereof, and the cleaner is filtered through a medium capable of removing solids larger than about 0.1 to 10 microns major dimension.

3,568,834

FILTERING ALKALINE METAL CLEANER

BACKGROUND OF THE INVENTION

1. Field of the Invention

The invention is concerned with filtering and maintaining alkaline metal cleaners of the type containing emulsified soluble oil.

2. Background of the Invention

Heretofore cleaners of the present type, which are designed to plate out an oil residue on the cleaned part, have simply been used until a heavy dirt load accumulates, and the cleaner is discarded when the emulsion breaks down or at least when it reaches incipient breakdown. Any filtration has been very coarse and rudimentary.

As technology has become more sophisticated, it is now highly desirable to keep heavy dirt loads from accumulating and depositing on cleaned precision parts. However, problems in getting the cleaner to pass through the filter are encountered when the filter medium is of a nature to remove solid particulate matter in the range of 0.1 to 10 microns major dimension and any larger particles. The filter plugs or blinds promptly and must be backwashed and recoated at frequent intervals, such as, 5 to 30 minutes, whereas filter cycles of 1 to 5 days or more are desired.

high alkalinity upon the introduction of acidic soils during the metal cleaning process. Such salts are also selected for surface active properties which facilitate the cleaning step. Surface active properties of the cleaner are sometimes further increased by adding surfactants, such as, soaps derived from fatty acids or resin acids, or, synthetic detergents or surface active materials such as certain adducts of ethylene oxide, sulfonated compounds, and amides. Generally, these materials fall into classes, anionic and nonionic compounds. An example of a suitable anionic compound is Nacconal NR, an alkyl aryl sulfonate. A suitable example of a nonionic compound is Dowfax 9N9 which is nonylphenol-9-mole ethylene oxide adduct.

Alkaline inorganic salts or compounds frequently used in these cleaners include sodium hydroxide, sodium orthosilicate, sodium metasilicate, trisodium phosphate, sodium metaborate, sodium carbonate, tetrasodium pyrophosphate, sodium tetraborate, and sodium polyphosphate. Very frequently, two or more of these are blended together in the metal cleaner.

Typical and representative metal cleaner formulations contain major ingredients tabulated as follows, on a dry basis, plus minor amounts of other salts or surfactants not listed, and not counting the soluble oil added in making up the aqueous working cleaner.

| Component and percent by wt. | Composition No. | | | | | | | | | |
|---|---|---|---|---|---|---|---|---|---|---|
| | 1 | 2 | 3 | 4 | 5 | 6 | 7 | 8 | 9 | 10 |
| $Na_2SiO_3 \cdot 5H_2O$ | 19.5 | 19.5 | | 96.8 | 100 | | | [1] 21.1 | | |
| $Na_2CO_3 \cdot H_2O$ | 22.7 | 49.1 | 41.6 | | | 38.5 | 29.7 | | | |
| NaOH | 43.5 | | 39.5 | | | 22.7 | 3.8 | 79.2 | 93.0 | 2 |
| $Na_3PO_4$ | | | 5.1 | | | [2] 16.3 | [3] 47.8 | | 2.5 | 12.5 |
| $Na_4P_2O_7$ | 7.2 | 15.1 | | | | | | | | 7.5 |
| Soap | | 22.3 | | | | 2.6 | 11.1 | | | |
| Resin and other organic | 6.6 | | 11.5 | 3.6 | | | | [4] 4.5 | | |
| Sodium borate | 5.20 | | | | | | | | | [5] 25 |
| Water | | | | | | 18.8 | 8.0 | | | |
| Other | | | | | | | | | | [6] 3 |

[1] Anhydride.
[2] $H_2O$.
[3] $12H_2O$.
[4] Tartaric acid.
[5] .5 $H_2O$, 50 .10 $H_2O$.
[6] $NaNO_2$.

Lubricant-coolant oil-in-water emulsions for metal working are stabilized and filtered and maintained according to the inventions described in my U.S. Pat. Nos. 3,408,843 and 3,409,551, issued Nov. 5, 1968.

OBJECT OF THE INVENTION

It is a principal object of the invention to provide a method of filtering an alkaline metal cleaner containing soluble oil, through a fine filter capable of retaining solids as fine as 0.1 to 5 microns, in a manner in which fine filtration takes place freely, and filter cycles of 1 to 5 days are readily and consistently attainable.

STATEMENT OF THE INVENTION

The invention is based on the discovery that upon periodically adding aminopolyacetic acid or ammonium or alkali metal salt thereof to alkaline metal cleaner, containing emulsified soluble oil, in the requisite amount to maintain unchelated hardness in the range of zero to 400 parts per million, expressed as $CaCO_3$, and free aminopolyacetic acid or ammonium or alkali metal salt content in the range of up to 2 percent, the metal cleaner is readily passed through a fine filter capable of removing particulate solid having major dimensions of 0.1 to 10 microns or greater.

DETAILED DESCRIPTION OF THE INVENTION

Metal cleaners of the type referred to herein are used to remove residual cutting oils, fines, grease and minor amounts of surface oxide or mill scale from metal parts such as those made of steel, iron, aluminum, zinc, magnesium and copper or brass. Such cleaners contain alkaline inorganic salts and sometimes caustic also. The salts are used to maintain reasonably Such cleaner formulations are generally dissolved in water to make about 0.4 to 1 percent by weight solution.

The soluble oil employed is generally a light mineral oil or oil blend or a fatty oil, such as palm oil. Such oils are used in the commercial soluble oils that are compounded with emulsifier and, often, a lubricity modifier, bactericide and detergent as well as water and a coupling agent. Such neat soluble oils are used in lubricating and cooling metal and worktools in metal shaping operations, and can be used in most of the metal cleaners treated according to the invention. Examples of suitable compounded oils include, for example, Solvac 1535G, Prosol 66, Rollex A, Majestic 101, Rol-Kleen 53, A-100, W.S. 51821, Tandemol C86 and Tandemol K87. If desired, the soluble oil can be compounded to suit the needs of the particular cleaner. The composition of the neat soluble oil itself forms no part of the present invention. The method of the invention is usable with substantially any metal cleaner containing a commercially available neat soluble oil or the equivalent thereof. Such neat soluble oils are generally employed in rather low concentration in the metal cleaner, such as, 0.1 to 5 percent by weight, more generally at a concentration of 2 percent or less and frequently in the range of about 0.5 to about 1 percent by weight.

The aqueous alkaline metal cleaner solution may have a pH in the range of 7.01 to 13, but generally has a pH greater than about 8, typically in the range of 8.5 to 10.5.

The chelating agents used in the method of this invention may be added in the free acid form or in the form of the alkali metal or ammonium salts of the aminopolyacetic acids which include ethylenediaminetetracetic acid, and its homologs and analogues such as N-hydroxyethylenediaminetriacetic acid, diethylenetriaminepentacetic acid, nitrilotriacetic acid, N-2-hydroxyethyliminodiacetic acid, cyclo-hexanediaminetetracetic acid and their obvious equivalents. These compounds may also be used in the form of their amine salts or soaps.

Generally the alkaline metal cleaner solutions are employed at a temperature of about 110 to about 160° F, though temperatures as low as about 70° F. and as high as about 180° F. are used on occasion. The method of the invention may be carried out at a temperature at which the cleaner works best up to the boiling temperature, though temperatures of about 120 to 140° F. are preferred in most instances to promote easy filtration without undue chemical attack on the metal part.

The problem solved using the process of the invention is not entirely understood, but it is believed that polyvalent metal ions, such as calcium and magnesium form insoluble, promptly unfilterable combinations with anions of the cleaner formulation. Calcium and magnesium and other polyvalent metal ions are provided by the water used to prepare the cleaner solution initially as well as water used as makeup to adjust for evaporative losses as well as drag out or plate out on the cleaned parts. Metal ions also enter the cleaner solution from the parts being cleaned as well as from concrete sump walls, and from pumps and pipes, spray heads, and other metal parts of the cleaner system.

In carrying out the method of the invention, the aqueous alkaline metal cleaner solution containing soluble oil is made up and brought to operating temperature and tested for polyvalent metal ion concentration using a standard water hardness test. If the hardness, expressed as $CaCO_3$, exceeds about 400 parts per million (p.p.m.), sufficient aminopolyacetic acid chelant or salt thereof is added to bring the unchelated hardness below about 400 p.p.m., and more preferably below 200 p.p.m., expressed as $CaCO_3$. If desired, sufficient chelant may be employed to chelate all the hardness and leave about 1 to 2 percent by weight free chelant, i.e., 1 to 2 percent more than is needed to chelate all the hardness present. Most preferably, unless foaming appears as a serious problem, the amount of chelant used reduces the hardness level to below about 50 p.p.m. and over to zero hardness and about 50 p.p.m. excess chelant.

The cleaner is circulated over metal parts to be cleaned and is then collected and pumped to dirty oil storage where some settling of solids preferably occurs and where it is also desirable to remove separated tramp oil and any separated oil floating on the dirty used emulsion. The emulsion is then filtered through a filter medium fine enough to remove solid particulate matter in the range of about 0.1 to 10 microns and larger, and generally 0.5 to 2 microns and larger.

Suitable filter media are diatomaceous earth products supplied by Johns-Manville in various grades, such as, Celite 545 and Hyflo Super-Cel. Conveniently, the filter medium is applied to a large area surface such as is found in a tube filter with a number of tubes.

Filtered cleaner flows to clean cleaner storage tank until drawn back into the circulating system again. While a bypass filter may be used to gain some improvement, the cleanliness of the cleaner improves with greater extent of filtration, resulting in less deposit of soluble salts on cleaned metal parts. Preferably all the emulsion cleaner is filtered during each cycle through the system, and more frequently, slightly more cleaner is filtered constantly than is circulated to metal cleaning machines or stations so that there is at least some reserve of clean cleaner ready at all times to enter the circulating system so that dirty cleaner need not be used to maintain cleaning operations.

In regular cleaning operations, the metal cleaner is sampled at least about every 8 hours and tested for hardness, whereupon the requisite amount of aminopolyacetic acid chelant or salt thereof is added to maintain a predetermined level of hardness, or chelant excess, usually in the form of a 35 to 50 percent by weight aqueous solution, though the chelant may be added in dry particulate form.

The so-maintained metal cleaner filters very readily using standard diatomaceous earth filter techniques, and filter cycles, i.e., times between back washings, of 1 to 5 days, are readily attained.

EXAMPLES

The following examples serve to illustrate the invention and the scope of the invention is not limited thereto.

EXAMPLE I

A metal cleaning solution for use in cleaning magnesium alloy and aluminum alloy aircraft engine parts is made up from two premixed compositions.

| Part A—Components: | Percent, by weight |
| --- | --- |
| $Na_2CO_3$ | 35 |
| $Na_3PO_4$ | 50 |
| NaOH | 5 |
| Sodium oleate | 10 |

Part B 40 sec. SUS at 100° F. mineral oil (Gulf 896), 90 parts by volume. Di Petronate L, Petroleum Sulfonate Emulsifier (Sonneborn Chemical & Refining Co.), 10 parts by volume.

The cleaner solution is made up in a 20,000 gallon quantity by dissolving the requisite amounts of part $A$ and part $B$ in city tap water (hardness content 200 p.p.m., expressed as $CaCO_3$) and at the rate of 2 ounces of part $A$ and 40 milliliters of part B in sufficient tap water to make one gallon of cleaner. The soluble oil is added for the purpose of providing a very thin residual protective oil film on the surface of the cleaned metal parts.

The cleaner solution is heated to 140° F. and is fed concurrently to ten spray washers rated at 100 gallons spray per minute and of a reservoir capacity of 1,500 gallons each. In the spray washers, the magnesium and aluminum parts are freed of dirt, metal fines, bearing grease and cutting oils. The dirty, used cleaner is gradually replaced and pumped to a central storage tank from which it is fed to a 1,500 gallon per minute diatomaceous earth tube filter. The filter tubes are coated with Johns-Manville Hyflo Super-Cel diatomaceous earth filter aid which removes solid particulate matter down to about 0.5 micron major dimension. The filtered cleaner is pumped from the filter to a storage tank for clean cleaner from which supply is drawn cleaner for the individual spray washers.

Upon using the fresh cleaner for cleaning metal parts, metal oxides, fines, dirt, grease, and soaps start to collect on the filter and interfere with easy rapid filtration. Within one hour and a half of steady use of the cleaner, the filter must be backwashed every 15 minutes because of excessive pressure differential across the filter. After 2 more hours of use, the filter must be backwashed every 10 minutes because of filter plugging or blinding.

On adding to the dirty cleaner, in the storage tank prior to filtration, sufficient 40 percent aqueous solution of the tetrasodium salt of ethylenediamine-tetracetic acid to chelate all the hardness present and leave 0.02 percent by weight free or unexhausted chelant in the cleaner, the cleaner becomes freely filterable using standard fine filtration techniques, including use of body feed. Filter cycles run mainly at 1 to 5 days for over six months use of the cleaner upon adding the requisite amount of said chelant, during each 8-hour period of use, to bring the free chelant level to about 0.02 percent by weight.

EXAMPLE 2

A metal cleaning solution for use in cleaning cast steel parts is made up from two premixed compositions.

| Part A—Component: | Percent by weight |
| --- | --- |
| $Na_2SiO_3$ | 24 |
| NaOH | 75 |
| Dowfax 2A-1 wetting agent | 1 |

Dowfax 2A-1 is the sodium salt of dodecylated sulfonated phenyl ether.

Part B 40 sec. SUS at 100° F. mineral oil (Gulf 896), 90 parts by volume. DiPetronate L, Petroleum Sulfonate Emulsifier (Sonneborn Chemical & Refining Co.), 10 parts by volume.

The cleaner solution is made in a 50,000 gallon quantity made up by dissolving the requisite amounts of part A and part B in city tap water (hardness content 200 p.p.m., expressed as $CaCO_3$) and at the rate of 1 ounce of part A and 40 milliliters of part B in sufficient tap water to make 1 gallon of cleaner. The soluble oil is added for the purpose of providing oil film on the surface of the cleaned metal parts.

The cleaner solution is heated to 120° F. and is fed concurrently to spray washers rated at 100 gallons per minute and of a capacity of 1,000 gallons each. In the spray washers, the cast steel parts are freed of dirt, metal fines, bearing grease and cutting oils. The dirty, used cleaner is pumped to a central storage tank from which it is fed to two 1,500 gallon per minute diatomaceous earth tube filters. the filter tubes are coated with Johns-Manville Hyflo Super-Cel diatomaceous earth filter aid which removes solid particulate matter down to about 0.5 micron major dimension. The filtered cleaner is pumped from the filter to a storage tank for clean cleaner from which supply is drawn cleaner for the individual spray washers.

Upon using the fresh cleaner for cleaning metal parts, metal oxides, fines, dirt, grease and soaps start to collect on the filter and interfere with easy rapid filtration. Within one hour and a half of steady use of the cleaner, the filter must be backwashed every 20 minutes because of excessive pressure differential across the filter. After three more hours of use, the filter must be backwashed every 15 minutes because of filter plugging or blinding.

On adding to the dirty cleaner, in the storage tank prior to filtration, sufficient 40 percent aqueous solution of the tetrasodium salt of ethylenediaminetetracetic acid to reduce the free hardness present to 50 p.p.m., expressed as $CaCO_3$, the cleaner becomes freely filterable using standard fine filtration techniques, including use of body feed. Filter cycles are immediately increased to 6 to 8 hours duration. After a day of steady operation, the concentration of hydrated iron or related compounds builds up in the cleaner to the point where these compounds are a factor in reducing filter cycles. At this point, the sodium salt of N-hydroxyethyl ethylenediaminetriacetic acid is added along with the sodium salt of ethylene diaminetetracetic acid to control polyvalent metal ions. Filter cycles are restored and run mainly at 1 to 5 days. Operations continue in this manner for 12 months' use of the cleaner upon adding the requisite amounts of the two chelants together as determined by analysis, during each 8-hour period of use, to maintain the unchelated hardness in the cleaner at a level of about 50 p.p.m. expressed as $CaCO_3$.

I claim:

1. The method of filtering an aqueous alkaline metal cleaner containing an emulsified soluble oil which comprises:

circulating the metal cleaner through a filter medium capable of removing particulate solids in the range of about 0.1 to 10 microns major dimension, and periodically adding to said metal cleaner the requisite amount of aminopolyacetic acid or ammonium or alkali metal salt thereof to maintain unchelated hardness in the metal cleaner at a level in the range of 0 to about 400 parts per million, expressed as $CaCO_3$, and up to 2 percent by weight of free polyacetic acid.

2. The method as in claim 1 in which the unchelated hardness is maintained in the range of about 5 to 150 parts per million, expressed as $CaCO_3$.

3. The method as in claim 1 in which the emulsion is maintained at a temperature in the range of about ambient room temperature to the incipient boiling temperature of the metal cleaner.

4. The method as in claim 3 in which the emulsion is maintained at a temperature in the range of about 70 to 180° F.

5. The method as in claim 1 in which the metal cleaner has a pH in the range of about 7.01 to about 13.

6. The method as in claim 5 in which the metal cleaner has a pH in the range of about 8.5 to 10.5.

7. the method as in claim 1 in which a greater volume of metal cleaner is filtered than is concurrently applied in metal cleaning operations.

8. The method as in claim 1 in which additions of aminopolyacetic acid or ammonium or alkali metal salt thereof are made at least once during each 8-hour period of cleaning operation.

9. The method as in claim 1 in which the filter medium is diatomaceous earth.

10. The method as in claim 1 in which the polyacetic acid is ethylene diamine tetracetic acid or an ammonium or sodium salt thereof.

11. The method as in claim 1 in which the metal cleaner is circulated and maintained for at least six months before being discarded.

12. The method as in claim 1 in which the metal cleaner contains from about 0.1 to 5 percent by weight of neat soluble oil.